(12) United States Patent
Morgan et al.

(10) Patent No.: US 8,120,883 B2
(45) Date of Patent: Feb. 21, 2012

(54) PROTECTIVE DEVICE WITH IMPROVED SURGE PROTECTION

(75) Inventors: Kent R. Morgan, Groton, NY (US); Richard Weeks, Little York, NY (US); Gerald R. Savicki, Jr., Canastota, NY (US); Kenneth D. Vought, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 13/164,328

(22) Filed: Jun. 20, 2011

(65) Prior Publication Data

US 2011/0242711 A1    Oct. 6, 2011

Related U.S. Application Data

(63) Continuation of application No. 12/780,342, filed on May 14, 2010, now Pat. No. 7,965,477, and a continuation of application No. 11/080,574, filed on Mar. 15, 2005, now Pat. No. 7,719,804.

(51) Int. Cl.
*H02H 3/00* (2006.01)

(52) U.S. Cl. .......................................................... 361/42

(58) Field of Classification Search ................ 361/42–50
See application file for complete search history.

(56) References Cited

U.S. PATENT DOCUMENTS

| | | | | |
|---|---|---|---|---|
| 4,168,514 A | * | 9/1979 | Howell | 361/56 |
| 4,288,833 A | * | 9/1981 | Howell | 361/124 |
| 4,739,436 A | * | 4/1988 | Stefani et al. | 361/56 |
| 5,032,946 A | * | 7/1991 | Misencik et al. | 361/56 |
| 6,556,394 B1 | * | 4/2003 | Wilson | 361/42 |
| 6,807,036 B2 | * | 10/2004 | Baldwin | 361/42 |
| 2006/0198066 A1 | * | 9/2006 | Chen et al. | 361/42 |

* cited by examiner

*Primary Examiner* — Stephen W Jackson
*Assistant Examiner* — Terrence Willoughby
(74) *Attorney, Agent, or Firm* — Daniel P. Malley; Bond Schoeneck & King

(57) ABSTRACT

The present invention is directed to an electrical wiring protection device that includes a housing assembly having a plurality of line terminals and a plurality of load terminals. A fault detection circuit is coupled to at least one of the plurality of line terminals and configured to generate a fault detection signal in response to detecting at least one fault condition in the electrical distribution system. A circuit interrupter assembly is coupled to the fault detection circuit. The circuit interrupter assembly is configured to couple the plurality of line terminals to the plurality of load terminals to form a conductive electrical path in a reset state, and decouple the plurality of line terminals from the plurality of load terminals in response to a fault detection signal in a tripped state. A voltage transient suppression circuit is connected between the plurality of line terminals, the voltage transient suppression circuit including a movistor differentially coupled relative to the at least one sensor circuit such that one lead of the movistor is coupled to a first line conductor disposed on a line side of the at least one sensor circuit and another lead of the movistor is coupled to a second line conductor disposed on a load side of the at least one sensor circuit. A movistor protection circuit is coupled in series to the movistor, the movistor protection circuit being configured to limit an amount of electrical energy applied to the movistor as a function of at least one electrical parameter.

29 Claims, 5 Drawing Sheets

PROTECTIVE DEVICE WITH IMPROVED SURGE PROTECTION

CROSS-REFERENCE TO RELATED APPLICATIONS

This is a continuation of U.S. patent application Ser. No. 12/780,342 filed on May 14, 2010, which is a continuation of U.S. patent application Ser. No. 11/080,574 filed on Mar. 15, 2005, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to electrical wiring devices, and particularly to protective wiring devices.

2. Technical Background

Electrical distribution systems that provide power to structures such as residences, commercial buildings or other such facilities typically include one or more breaker panels coupled to a source of AC power. Of course, the breaker panel distributes AC power to one or more branch electric circuits installed in the structure. The electric circuits may typically include one or more receptacle outlets and may further transmit AC power to one or more electrically powered devices, commonly referred to in the art as load circuits. The receptacle outlets provide power to user-accessible loads that include a power cord and plug, the plug being insertable into the receptacle outlet. However, certain types of faults have been known to occur in various portions of the electrical distribution systems. Accordingly, electric circuit protection devices may be disposed throughout the distribution system, i.e., in the breaker panel and in protective devices having receptacle outlets. Protective devices may also be installed in the electrical load itself.

Both receptacle wiring devices and electric circuit protective wiring devices may be disposed in an electrically non-conductive housing. The housing includes electrical terminals that are electrically insulated from each other. Line terminals couple the wiring device to conductors that provides electrical power from the electrical distribution system. Load terminals are coupled to wiring that directs AC power to one or more electrical loads. Those of ordinary skill in the pertinent art will understand that the term "load" refers to an appliance, a switch, or some other electrically powered device. Load terminals may also be referred to as "feed-through" terminals because the wires connected to these terminals may be coupled to a daisy-chained configuration of receptacles or switches. The load may ultimately be connected at the far end of this arrangement. The load terminals may also be connected to an electrically conductive path that is also connected to a set of receptacle contacts. The receptacle contacts are in communication with receptacle openings disposed on the face of the housing. This arrangement allows a user to insert an appliance plug into the receptacle opening to thereby energize the device.

As noted above, there are several types of electric circuit protection devices. For example, such devices include ground fault circuit interrupters (GFCIs), ground-fault equipment protectors (GFEPs), and arc fault circuit interrupters (AFCIs). This list includes representative examples and is not meant to be exhaustive. Some devices include both GFCIs and AFCIs. As their names suggest, arc fault circuit interrupters (AFCIs), ground-fault equipment protectors (GFEPs) and ground fault circuit interrupters (GFCIs) perform different functions. An arc fault typically manifests itself as a high frequency current signal. Accordingly, an AFCI may be configured to detect various high frequency signals and de-energize the electrical circuit in response thereto. A ground fault occurs when a current carrying (hot) conductor creates an unintended current path to ground. A differential current is created between the hot/neutral conductors because some of the current flowing in the circuit is diverted into the unintended current path. The unintended current path represents an electrical shock hazard. Ground faults, as well as arc faults, may also result in fire. A "grounded neutral" is another type of ground fault. This type of fault may occur when the load neutral terminal, or a conductor connected to the load neutral terminal, becomes grounded.

When a device is installed, its line terminals are connected to an AC power source, such as a single phase 120 VAC AC power source. However, transient voltages may propagate in an electrical distribution system as well as the AC power signal. Further, the amplitudes of transient voltages are typically greater than the amplitude of the source voltage by at least an order of magnitude. Transient voltage pulses may be generated by any number of events. For example, transient voltages may be introduced into the distribution system by lightning. Transient voltages may also be generated when an inductive load is turned off, when a motor with noisy brushes is operated, or by other such load situations.

Transient voltages are known to damage protective devices such that the device will cease to function as designed. This is sometimes referred to as an end of life condition. End of life failure modes include failure of device circuitry, the relay solenoid that opens the GFCI interrupting contacts, and/or the solenoid driving device, such as a silicon controlled rectifier. The damage may result in the protective device permanently denying power to the protected portion of the electric circuit. In this case, the user is forced to replace the protective device. Alternatively, the damage may result in the protective device still providing power to the load even though the device has become non-protective. In this case, the user is left unprotected after an end-of-life condition has occurred. Thus the user is either inconvenienced by having to change out the device, or even worse, he is left unprotected.

Most devices include surge protection components. However, surge protection components occupy a considerable volume within the device housing. As a result, the overall size of the device is relatively large, making it harder to install the device within a wall box. Another problem is that surge protective components themselves are known to experience an end-of-life condition. If the surge protection component fails, the device is unprotected from damages due to transient voltages.

Accordingly, a compact protective device that includes an improved space-conserving surge protection arrangement is needed that continues to afford protection after the occurrence of a voltage transient event on the electrical distribution system. The compact protective device must be configured to reliably protect the user from a fault condition in the electrical power distribution system. Further, a protective device is needed that is equipped to decouple the load terminals from the line terminals in the event of an end of life condition.

SUMMARY OF THE INVENTION

The present invention addresses the needs described above by providing a compact protective device that includes an improved space-conserving surge protection arrangement is needed that continues to afford protection after the occurrence of a voltage transient event on the electrical distribution system. The compact protective device of the present invention is configured to reliably protect the user from a fault condition in the electrical power distribution system. Further, the protective device of the present invention is equipped to decouple the load terminals from the line terminals in the event of an end of life condition.

One aspect of the present invention is directed to an electrical wiring protection device that includes a housing assembly having a plurality of line terminals and a plurality of load terminals. A fault detection circuit is coupled to at least one of the plurality of line terminals and configured to generate a fault detection signal in response to detecting at least one fault condition in the electrical distribution system. A circuit interrupter assembly is coupled to the fault detection circuit. The circuit interrupter assembly is configured to couple the plurality of line terminals to the plurality of load terminals to form a conductive electrical path in a reset state, and decouple the plurality of line terminals from the plurality of load terminals in response to a fault detection signal in a tripped state. A voltage transient suppression circuit is connected between the plurality of line terminals, the voltage transient suppression circuit including a movistor differentially coupled relative to the at least one sensor circuit such that one lead of the movistor is coupled to a first line conductor disposed on a line side of the at least one sensor circuit and another lead of the movistor is coupled to a second line conductor disposed on a load side of the at least one sensor circuit. A movistor protection circuit is coupled in series to the movistor, the movistor protection circuit being configured to limit an amount of electrical energy applied to the movistor as a function of at least one electrical parameter.

In yet another aspect, the present invention is directed to an electrical wiring protection device has a housing assembly including a plurality of line terminals and a plurality of load terminals. A fault detection circuit is coupled to at least one of the plurality of line terminals and configured to generate a fault detection signal in response to detecting at least one fault condition in the electrical distribution system. A circuit interrupter is coupled to the fault detection circuit. The circuit interrupter is configured to couple the plurality of line terminals to the plurality of load terminals to form a conductive electrical path in a reset state, and decouple the plurality of line terminals from the plurality of load terminals in response to the fault detection signal in a tripped state. A voltage transient suppression circuit is coupled to at least one of the plurality of line terminals. The voltage transient suppression circuit conducts a leakage current in the event of failure, wherein the voltage transient suppression circuit is configured such that the leakage current generates a signal simulating the at least one fault condition when the circuit interrupter is in the reset state. An auxiliary switch is coupled to the voltage transient suppression circuit. The auxiliary switch decouples the voltage transient suppression circuit from the plurality of line terminals when the circuit interrupter is in the tripped state.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
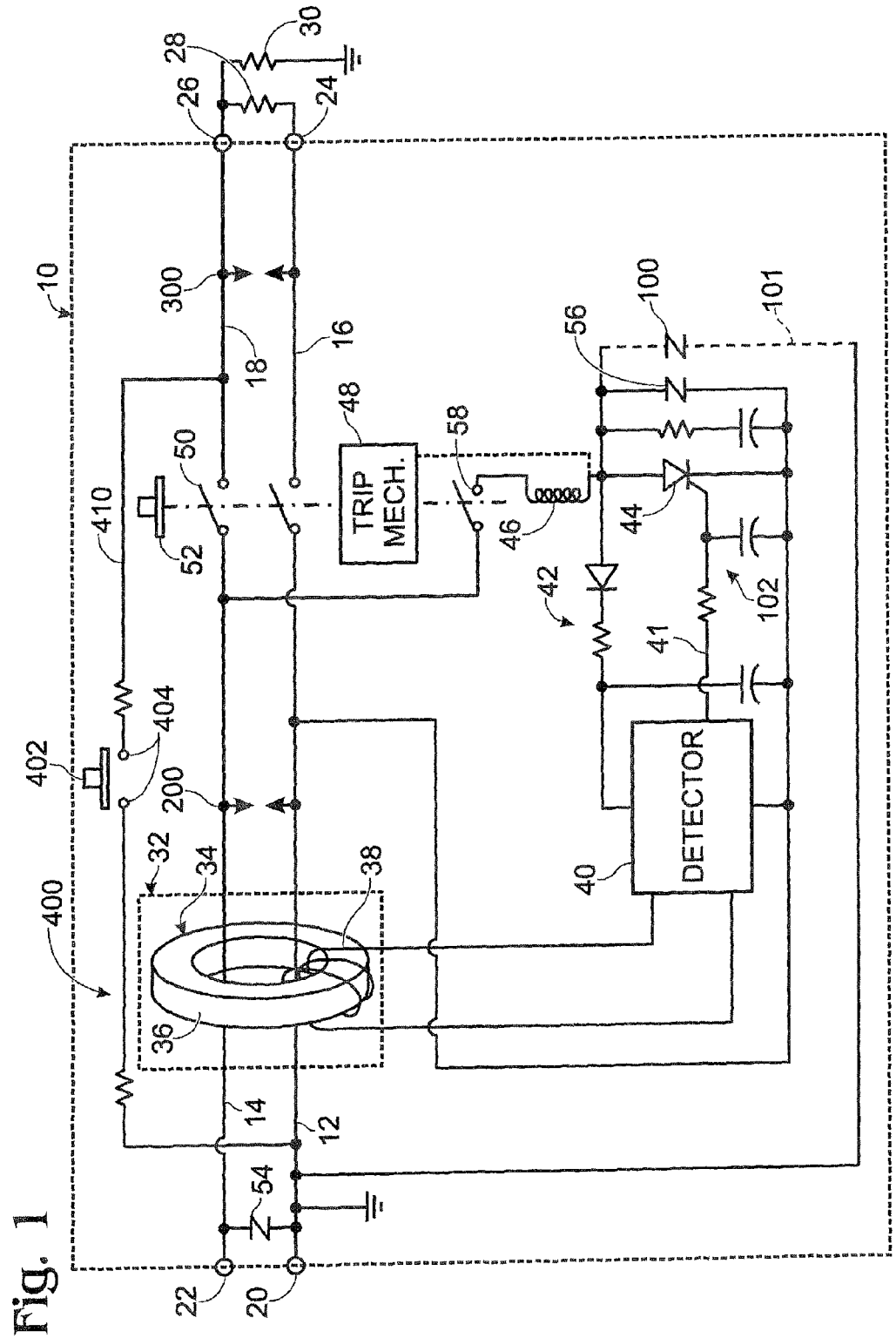
FIG. 1 is a block diagram of an electrical wiring device in accordance with a first embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the wiring device of the present invention is shown in FIG. 1, and is designated generally throughout by reference numeral 10.

As embodied herein, and depicted in FIG. 1, a block diagram of an electrical wiring device 10 in accordance with a first embodiment of the present invention is disclosed. FIG. 1 is a general protection device in that detector 40 may be configured as a GFCI detector, a GFEP detector, an AFCI detector or a combination thereof. In other words, the teachings of the present invention are applicable to each type of protective wiring device.

The protective device 10 includes neutral line terminals 20 and hot line terminal 22 which are employed to connect device 10 to a source of AC power, i.e., to the distribution wiring connected to the breaker panel. The electrical distribution system may distribute power using single phase, split phase or multiple phase configurations by using two or more conductors. The wiring device 10 shown in FIG. 1 is configured for single phase distribution. Device 10 also includes neutral load terminal 24 and hot load terminal 26 that are used to connect device 10 to load 28. Line terminals 20, 22 are coupled to load terminals 24, 26 by the interruptible conductive path that includes neutral line conductor 12 and hot line conductor 14. Neutral line conductor 12 and hot conductor 14 pass through sensor assembly 32 and terminate at circuit interrupter contacts 50. The interruptible conductive path also includes neutral load conductor 16 and hot load conductor 18, which are connected to load terminals 24, 26, respectively. A test circuit 400 is coupled between neutral line conductor 12 and hot load conductor 18.

During normal operations when no fault is present, the contacts 50 are closed and AC power is provided to load 28 in the reset state. Generally speaking, sensor assembly 32 is coupled to fault detector 40. Fault detector 40 is coupled to SCR 44. SCR 44 energizes the trip solenoid 46 when it is in a conducting state. In turn, the trip solenoid 46 drives trip mechanism 48. When trip mechanism 48 is activated, contacts 50 are opened. The device may be driven from the tripped state to the reset state by pushing reset button 52.

If device 10 includes GFCI protection, sensor assembly 32 is configured to sense the differential current flowing through the conductors 12, 14. When device 10 provides power to a load 28 under normal conditions, the differential current in the conductors 12, 14 is zero. In other words, the currents to and from the load are equal in magnitude and opposite in polarity. However, when a ground fault (30) is present, a hot conductor in load 28 is coupled to ground. While the current through the hot conductor is sensed by sensor assembly 32, the return current is diminished because the current flowing through the ground fault 30 flows to ground instead of returning through sensor assembly 32. Thus, the differential current is not zero. If the differential current exceeds a predetermined amount, detector 40 provides a fault signal on detector output line 41.

As those skilled in the art will recognize, differential transformer 34 senses differential current via the magnetic field induced by the current flowing through conductors 12, 14. In particular, conductors 12, 14 pass through the aperture of a toroidal core 36. A non-zero current (differential current) in the conductors induces a magnetic flux in core 36 to induce a signal in winding 38. Depending on the type of protective device, sensor assembly 32 may include additional sensors (not shown) such as current transformers, shunts, voltage dividers, additional toroidal transformers and the like. Such sensors are chosen to sense the fault condition(s) of interest. Signal from winding 38 and from other sensors that may be included in the sensor assembly 32 are provided to detector 40.

As noted above, detector 40 determines whether the signal from sensor assembly 32 represents a fault condition. If a fault condition is detected, detector 40 provides a signal to solid state switch 44 to energize solenoid 46. Solenoid 46 in turn actuates trip mechanism 48 to open circuit interrupting contacts 50. Interrupting contacts 50 disconnect at least the hot load terminal 26 from the hot line terminal 22, but may also serve to disconnect the neutral load terminal 24 from neutral line terminal 20. Either way, device 10 is tripped.

Current stops flowing through the fault 30 when the device 10 trips. With power to the fault removed, detector 40 can no longer provide a fault detect signal to solid state switch 44. Solid state switch 44 turns off and solenoid 46 is de-energized. The interval of time between the instant solenoid 46 energizes to trip the circuit interrupter, and the time it de-energizes after the fault condition is successfully eliminated, is typically less than 25 milliseconds. In the embodiment depicted in FIG. 1, solenoid 46 is implemented using a miniaturized construction because it does not have to be sized to withstand the heat that would be generated if the solenoid were continuously energized.

As noted above, transient voltages are known to damage protective devices such that the device will cease to function as designed. Device 10 may be protected from high voltage transients by connecting a metal oxide varistor (MOV) 54 across the line and/or load terminals to clamp the transient voltage to a predetermined threshold. Of course, the predetermined voltage threshold is calculated such that device 10 survives the transient event. However, when employing this means for providing transient protection, MOV 54 must be relatively large in size to effectively clamp the transient voltage to an appropriate threshold. MOV 54 may be greater than 12 mm in diameter. As might be expected, a 12 mm MOV is usually relatively costly.

Accordingly, one transient protection feature of the present invention includes the use of a MOV 56 in combination with an inductive component, such as solenoid 46. Voltage transients typically have an amplitude of 1 to 6 kV. Because they are relatively brief in duration, they have frequency components that may be greater than 100 kHz. On the other hand, the impedance of solenoid 46 is typically greater than 500 Ohms at a frequency of 100 kHz. Thus, the frequency dependence of the coil impedance may be used to safeguard MOV 56. Accordingly, MOV 56 may be downsized to take advantage of the frequency dependence of the coil impedance. In other words, MOV 56 may have a diameter that is less than or equal to 7 mm, while still managing to clamp the voltage at an appropriate threshold, because the solenoid impedance limits the amount of current through MOV 56. This approach may also provide cost benefits as well. A smaller MOV is relatively inexpensive when compared to a larger MOV. Further, the life expectancy of MOV 56 may be greatly increased by the impedance of solenoid 46 because it restricts the amount of current through the MOV for a given voltage transient magnitude. However, it is still possible for MOV 56 to experience an end-of-life condition.

An end-of-life condition may occur if the magnitude of the voltage transient is large enough. An end-of-life condition may also occur if there are a large number of voltage transients. Environmental stresses may also play a part in causing a failure. Whatever the cause, at end-of-life, a MOV becomes increasingly resistive in nature. If the resistance of MOV 56 is less than about 100 Ohms, solenoid 46 is sufficiently coupled to the power source to actuate trip mechanism 48 to open interrupting contacts 50. The current flowing through the resistance of MOV 56 would also be conducted through solenoid 46. The current, if uninterrupted, would cause solenoid 46 to burn out.

The present invention includes an auxiliary switch mechanism to avoid solenoid burn-out. An auxiliary switch 58 is disposed in series with solenoid 46. Auxiliary switch 58 is coupled to the trip mechanism 48, or alternatively, to the interrupting contacts 50 such that the contacts of auxiliary switch 58 open when the circuit interrupter is in the tripped condition. Device 10 may be reset by manually actuating reset button 52. This also results in the contacts of auxiliary switch 58 being closed. Upon reset, solenoid 46 is again coupled to the power source by way of the resistance of MOV 56, and again, trip mechanism 48 opens contacts 50 as well as the contacts of auxiliary switch 58. In sum, when MOV 56 has reached end-of-life, solenoid 46 is only momentarily energized. Solenoid 46 actuates the trip mechanism each time a reset action attempt is repeated. Even though MOV 56 has experienced an end-of-life condition, device 10 maintains its protective functionality. There is one caveat, however.

If the end-of-life resistance of MOV 56 is greater than 100 Ohms, solenoid 46 may not be sufficiently coupled to the voltage source to trip the interrupting mechanism 48. If the interrupting mechanism does not trip, the current through solenoid 46 will not be interrupted by auxiliary switch 58. The uninterrupted current through solenoid 46 might cause the solenoid to burn out.

Referring to dashed line 101, in an alternate embodiment MOV 100 may be included to protect device 10 from a high voltage transients. Unlike MOV 56, MOV 100 prevents solenoid burn-out for all end-of-life resistance values. Note that MOV 100 is connected in series with solenoid 46. Thus, it is protected by the impedance of solenoid 46 in a similar manner to what has been described for MOV 56. However, because of the series combination of MOV 100 and solenoid 46, the current flowing through the series combination creates a differential current in the conductors passing through differential transformer 34. Detector 40 responds to the differential current and causes the device to trip in the manner previously described. The predetermined threshold for a GFCI is typically 6 mA, and for a GFEP or AFCI is typically 30 mA. Should the end-of-life resistance of MOV 100 generate a current greater than the detection threshold in detector 40, device 10 will trip and auxiliary switch 58 will open to protect solenoid 46 from burnout.

Of course, if the current flowing through the series combination of MOV 100 and solenoid 46 are less than the detection threshold, device 10 will not trip. However, solenoid 46 is configured to be able to withstand the continuous flow of current of this magnitude. By way of illustration, if MOV 100 has a resistance that is less than about 4,000 Ohms, a device having a 30 mA detection threshold will trip, because the current generated will be greater than the threshold. On the other hand, as MOV 100 becomes more resistive, i.e., the resistance becomes greater than about 4,000 Ohms; the current generated is less than the differential current threshold and device 10 will not trip. However, solenoid 46 is configured to withstand current that is less than the detection threshold. Accordingly, solenoid 46 will not burn out in either scenario because the voltage transient circuit is coupled to the fault detector and generates a differential current which in turn causes the protective device to trip. The protective device of the present invention is both safe and reliable in the face of an end-of-life condition.

Another feature of the present invention relates to preventing device 10 from being tripped by brief signals from sensor 32 that arise during voltage transient events. In particular, low pass filter 102 may be disposed between detector output 41 and SCR 44. Filter 102 is configured to filter out the momentary currents that flow through MOV 100 to prevent solid state switch 44 from responding to voltage transient events. As a result, trip mechanism 48 is not nuisance-actuated by these voltage transient events. In an alternative embodiment, low pass filter 102 may be implemented in detector 40 to avoid using discrete components.

Another feature of the present invention provides spark gaps (200, 300) for the absorption of the energy from the most severe transients. For example, voltage transients due to lightning have been known to produce 10 kV and/or 10 kA. The spark gaps are disposed in device 10 such that the surge current passing through the spark gap does not generate an output signal from sensor assembly 32. In other words, the spark gap(s) 200, 300 are configured such that the discharge current is not manifested as a differential current that may possibly be sensed by transformer 34. Spark gaps 200, 300 allow protective device 10 to remain in an operational condition in the presence of extremely severe voltage transients, or the currents that result from such voltage transients.

Figure 2:
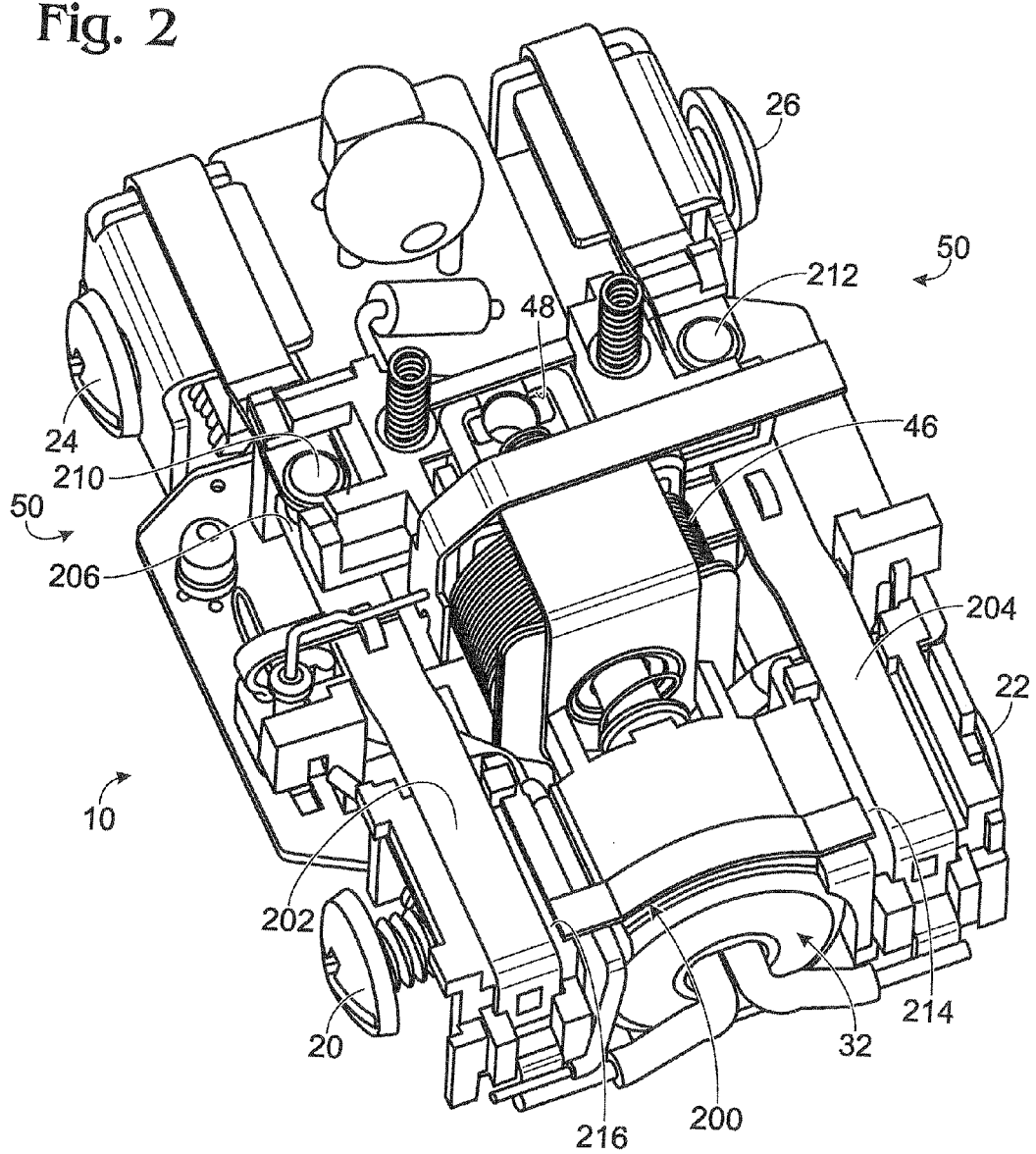
FIG. 2 is a perspective view of a line spark gap structure in accordance with one embodiment of the present invention.

Referring to FIG. 2, a perspective view of device 10 is shown that illustrates a spark gap structure 200 in accordance with the present invention. Spark gap structure 200 is disposed between the line terminals 20, 22, and under sensor assembly 32. The contact assembly 50 is implemented by movable contacts 206, 208 and fixed contacts 210, 212. In particular, cantilever member 202 is connected to line neutral terminal 20 and cantilever member 204 is connected to line hot terminal 22. Movable contacts 206, 208 are disposed at the distal ends of cantilever beams 202, 204, respectively. Load terminals 24, 26 are electrically connected to fixed contacts 210, 212. Trip mechanism 48 is configured to move contact pairs (206, 210) and (208, 212) into electrical connection when device 10 is reset and to move them out of electrical connection when device 10 is tripped.

Spark gap structure 200 is an electrically conductive member disposed between cantilever beams 202, 204. Air gap 214 is disposed between cantilever 204 and one end of the spark gap structure 200, whereas air gap 216 is disposed between cantilever 202 and the other end of the spark gap structure 200. The sum of gaps 214, 216 are typically between 0.030 and 0.060 inches. The gap structure 200 may be implemented such that the two gaps may be unequal. Further, one of the air gaps may be eliminated. Finally, an insulating material that bridges the gaps may be included. A typical length of the insulating material is at least 0.250 inches in length.

Figure 3:
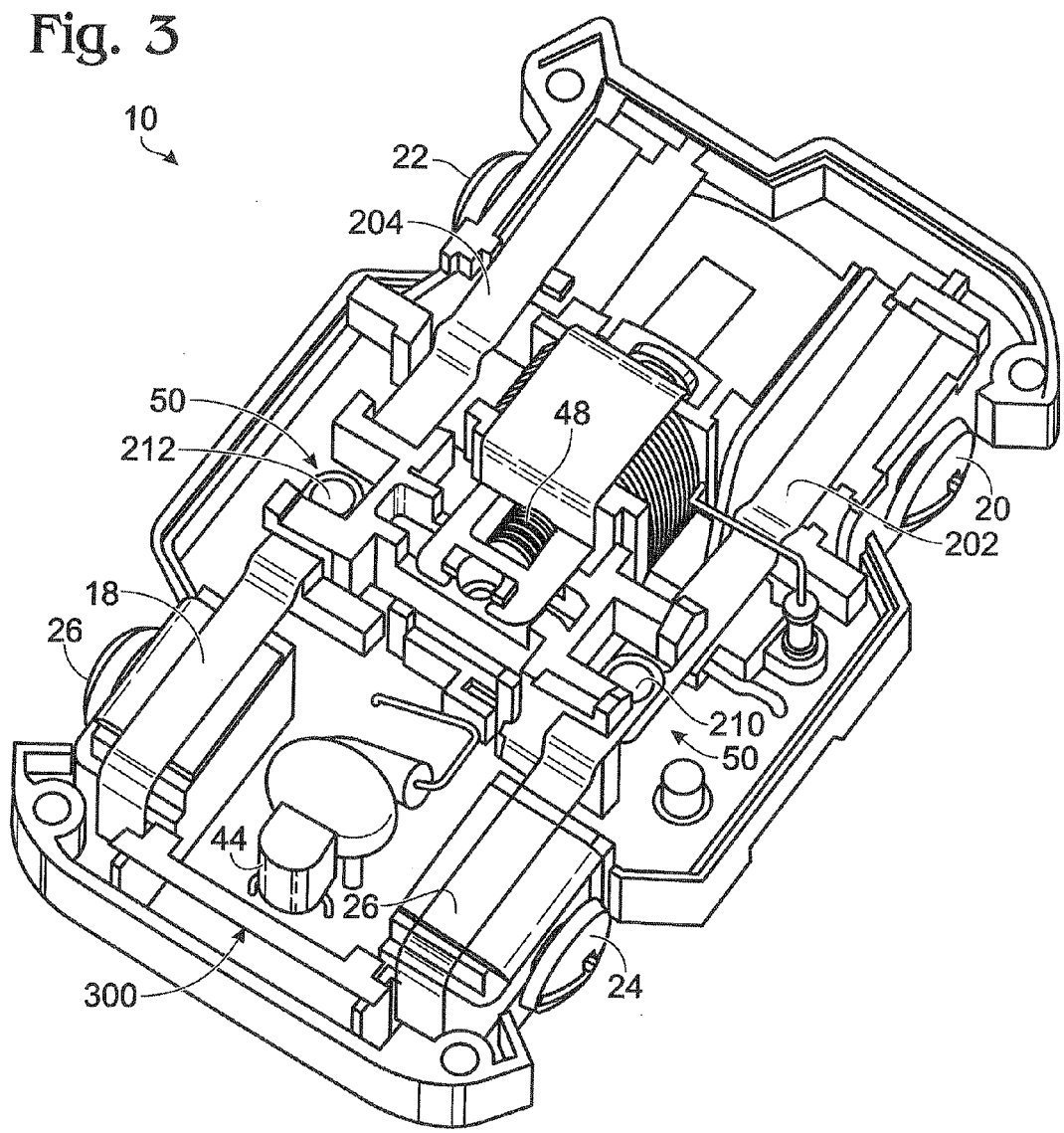
FIG. 3 is a perspective view of a load spark gap structure in accordance with another embodiment of the present invention.

As shown in FIG. 1, a second air gap structure 300 may be disposed between the load conductors 16, 18. Referring to FIG. 3, a perspective view of the load spark gap structure 300 is disclosed. Spark gap structure 300 is disposed between conductors 16, 18 that connect the load terminals 24, 26 to fixed contacts 210, 212. Spark gap structure 300 is also configured to absorb the energy generated by a severe voltage transient event.

The present invention contemplates using any type of suitable structure to implement interrupting contacts 50. Reference is made to U.S. patent application Ser. No. 10/900,769, filed Jul. 28, 2004, which is incorporated herein by reference as though fully set forth in its entirety, for a more detailed explanation of the various types of circuit interrupting structures that may be employed to implement the present invention.

Figure 4:
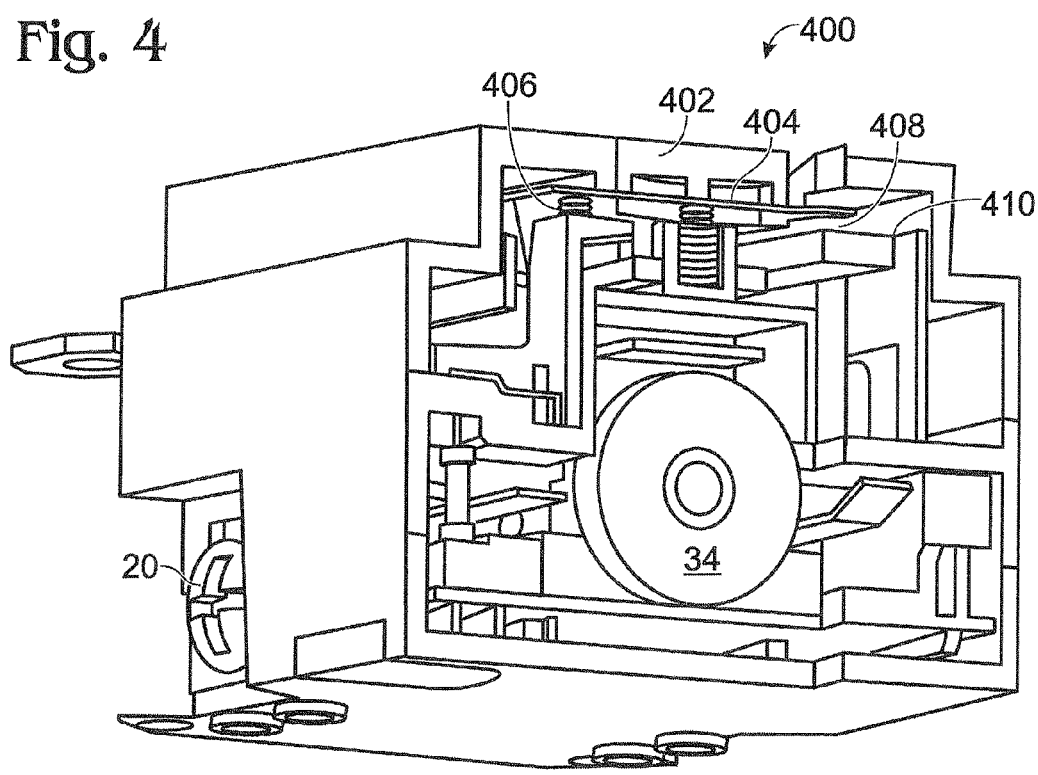
FIG. 4 is a sectional view of the device depicted in FIG. 1.

FIG. 4 is a partial sectional view of a device 10 that shows test circuit 400 and test button 402. Contacts 404 are normally open. Using a GFCI as an example, test circuit 400 couples the hot load terminal 26 to neutral line terminal 20 when test button 402 is depressed (See also FIG. 1 for a schematic representation). The resulting current through test circuit 400 is sensed by differential transformer 34 in the same manner as a true ground fault condition. The gap between open contacts 404 is required to be greater than a predetermined spacing to prevent the test circuit 400 from becoming damaged during a voltage transient event. The predetermined gap is approximately 0.100 inches. However, any requirement that would necessitate test button 402 to travel 0.100 inches to close the gap would not be ergonomic. Accordingly, the gap between test button 402 and contacts 404 may be reduced by providing gaps 406 and 408. Note that the MOVs (56, 100) and the air gap structures (200, 300) provide the test circuit 400 with transient protection.

In another embodiment, test circuit 400 may also be configured to provide automatic testing of device 10. Reference is made to U.S. Pat. No. 6,674,289 and U.S. patent application Ser. No. 10/668,654 which are incorporated herein by reference as though fully set forth in its entirety, for a more detailed explanation of the automatic test circuit 400.

Figure 5:
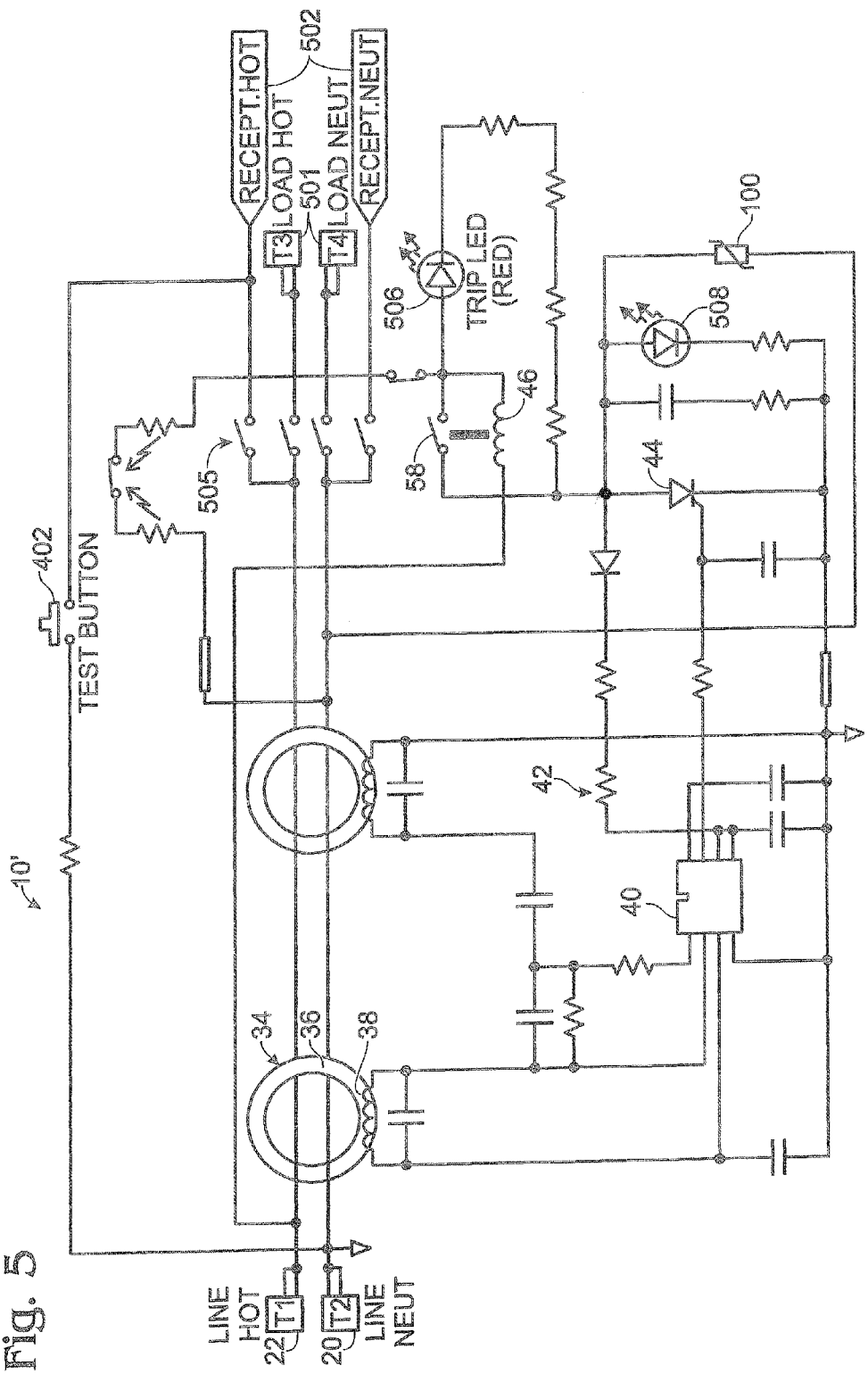
FIG. 5 is a circuit diagram of a GFCI embodiment in accordance with the present invention.

Referring to FIG. 5, a circuit diagram of a GFCI embodiment 10' is shown. Device 10' includes feed-through terminals 501 configured to connect device 10' to the wiring that provides power to downstream receptacles. Device 10' also includes receptacle load terminals 502 that are configured to accept a plug from a user attachable load. Interrupting contacts 505 are configured to disconnect the feed-through terminals 501 from the load terminals 502 when device 10' is in the tripped condition.

Indication components are included to alert the user to the reset or tripped status of device 10'. Indication components may include visual indicators, audible indicators, or both. Such indicators are configured to emit a steady indication or, alternatively, may emit an intermittent indication such as visual flashing or audible beeping. In particular, device 10' provides an indicator 506 that is coupled in parallel with auxiliary switch 58. Referring to the schematic diagram, indicator 506 emits a signal when device 10' is connected to an AC power source and tripped. Indicator 508 may be coupled in series with auxiliary switch 58. Indicator 508 emits a signal when device 10' is connected to a source of power and is reset. Indicator 506 and indicator 508 may be used in combination or separately. Note that MOV 100 (or 56) limits the amplitude of the voltage transient that could otherwise create an end-of-life condition in the auxiliary switch 58, or in the indicators 506, 508.

Figure 6:
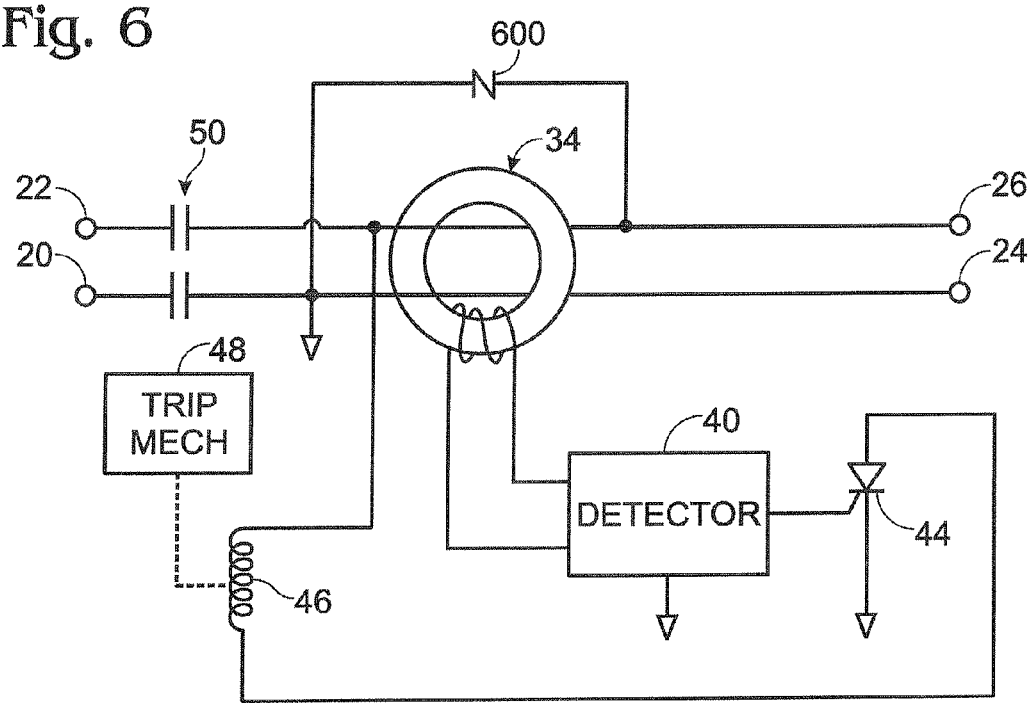
FIG. 6 is a partial schematic diagram of a protective device in accordance with another embodiment of the present invention.

Referring to FIG. 6, a partial schematic diagram of a device in accordance with another embodiment of the present invention is shown. In this embodiment, MOV 600 is connected across the load terminals 24, 26. MOV 600 is coupled to differential transformer 34 so as to generate a differential current when an end-of-life condition occurs. Transformer 34 is coupled to the load side of device 10. In the manner previously described, the differential current is detected by detector 40. In turn, detector 40 provides a signal to solid state switch 44 to energize solenoid 46. Trip mechanism 48 is activated in response thereto, opening interrupting contacts 50. Accordingly, an end-of-life condition in MOV 600 is interrupted before MOV 600 is able to overheat. The interruption of the current is accomplished by interrupting contacts 50. MOV 56 and MOV 100 may be coupled to the line terminals 20, 22 by way of solenoid 46 in the manner previously described.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring protection device for use in an AC electrical distribution system, the device comprising:
   a housing assembly including a plurality of line terminals and a plurality of load terminals, the plurality of load terminals including a plurality of feed through load terminals and a plurality of receptacle load terminals;
   at least one sensor circuit coupled between the plurality of line terminals and the plurality of load terminals, the at least one sensor circuit being configured to provide at least one sensor signal based on an AC power signal propagating in the AC electrical distribution system;
   a fault detection circuit coupled to the at least one sensor circuit and configured to monitor the at least one sensor signal, the fault detection circuit being configured to provide a fault detection signal in response to detecting at least one fault condition in the AC electrical distribution system;
   a circuit interrupter assembly coupled to the fault detection circuit, the circuit interrupter assembly including four sets of interrupting contacts that are configured to provide electrical continuity between the plurality of line terminals and the plurality of load terminals in a reset state and configured to interrupt the electrical continuity in a tripped state, the reset state being effected when the circuit interrupter assembly is engaged by a mechanical linkage in response to a user stimulus, the tripped state being effected when the circuit interrupter assembly is disengaged from the mechanical linkage in response to the fault detection signal;
   a voltage transient suppression circuit connected between the plurality of line terminals, the voltage transient suppression circuit including
      a movistor differentially coupled relative to the at least one sensor circuit such that one lead of the movistor is coupled to a first line conductor disposed on a line side of the at least one sensor circuit and another lead of the movistor is coupled to a second line conductor disposed on a load side of the at least one sensor circuit, and
      a movistor protection circuit coupled in series with the movistor, the movistor protection circuit being configured to limit an amount of electrical energy applied to the movistor as a function of at least one electrical parameter.

2. The device of claim 1, wherein the movistor conducts a leakage current in the event of movistor failure, the fault detection circuit being configured to detect the leakage current as the at least one fault condition when the leakage current exceeds a predetermined value.

3. The device of claim 1, wherein the movistor protection circuit includes an auxiliary switch configured to couple the movistor between the plurality of line terminals.

4. The device of claim 3, wherein the auxiliary switch is configured to decouple the movistor from the plurality of line terminals in the tripped state.

5. The device of claim 3, wherein the auxiliary switch is configured to switch the movistor between a relatively high current path in the reset state and a relatively low current path in the tripped state.

6. The device of claim 1, wherein the movistor protection circuit includes a filter circuit configured to limit the amount of electrical energy by filtering out transient signals having predetermined frequency components.

7. The device of claim 6, wherein the filter circuit includes an inductive component characterized by a frequency dependent inductive impedance.

8. The device of claim 6, wherein the filter circuit includes a solenoid configured to trip the circuit interrupter assembly in response to the fault detection signal, the solenoid being characterized by a frequency dependent inductive impedance.

9. The device of claim 8, wherein the inductive impedance is greater than or equal to about 500 Ohms at a frequency of about 100 KHz.

10. The device of claim 8, wherein the solenoid is disposed in series with the movistor.

11. The device of claim 8, wherein the solenoid and the movistor are disposed in series with an auxiliary switch, the auxiliary switch being configured to decouple the movistor from the plurality of line terminals when the circuit interrupter assembly is in the tripped state.

12. The device of claim 8, wherein the solenoid and the movistor are disposed in series with an auxiliary switch, the auxiliary switch being configured to switch between a relatively high current path in the reset state and a relatively low current path in the tripped state.

13. The device of claim 1, wherein the voltage transient suppression circuit includes a second movistor disposed between the plurality of line terminals or between the plurality of load terminals.

14. The device of claim 1, wherein the voltage transient suppression circuit further includes a spark gap structure coupled between the plurality of line terminals or the plurality of load terminals.

15. The device of claim 1, further comprising:
a test circuit that is coupled to the plurality of line terminals, the test circuit being configured to automatically generate a simulated fault condition signal that simulates the at least one fault condition on a periodic basis;
an end of life monitoring circuit configured to monitor the fault detection circuit for a test acceptance signal in response to the simulated fault condition, the test acceptance signal being provided by the fault detection circuit when the fault detection circuit is not experiencing an end of life condition; and
an end-of-life actuation circuit configured to effect the tripped state when the test acceptance signal is not generated within a predetermined period of time.

16. The device of claim 15, further comprising:
an actuation assembly disposed between the fault detection circuit and the circuit interrupter assembly, the actuation assembly including a first solid state switch coupled to a solenoid, the first solid state switch being configured to conduct current and energize the solenoid in response to the fault detection signal, the solenoid being configured effect the tripped state when energized; and
wherein the end-of-life actuation circuit includes a second solid state switching device coupled to the solenoid, the solenoid being energized when the test acceptance signal is not generated within a predetermined period of time.

17. The device of claim 16, wherein the movistor is configured to generate the simulated fault condition signal when experiencing a component failure condition.

18. The device of claim 16, wherein the solenoid includes a plurality of solenoid windings.

19. The device of claim 15, wherein the simulated fault condition signal is created during recurring portions of the AC line voltage.

20. The device of claim 19, wherein the recurring portions are during a negative half cycle of the AC line voltage.

21. The device of claim 16, wherein the first solid state switching device is an SCR device.

22. The device of claim 15, wherein the test circuit operates without execution of software instructions.

23. The device of claim 15, wherein the end of life monitoring circuit operates without execution of software instructions.

24. The device of claim 15, wherein the end of life actuation circuit operates without execution of software instructions.

25. The device of claim 1, wherein the movistor protection circuit further comprises:
an actuation solenoid coupled between the fault detection circuit and the movistor, the actuation solenoid being characterized by a frequency dependent inductive impedance configured to protect the movistor from transient signals over a predetermined range of frequencies; and
an auxiliary switch coupled to the actuation solenoid.

26. The device of claim 25, wherein the auxiliary switch is configured to decouple the movistor from the plurality of line terminals in the tripped state.

27. The device of claim 25, wherein the auxiliary switch is configured to switch the movistor between a relatively high current path in the reset state and a relatively low current path in the tripped state.

28. The device of claim 27, wherein the relatively low current path includes a current limiting resistance.

29. An electrical wiring protection device for use in an AC electrical distribution system, the device comprising:
a housing assembly including a plurality of line terminals and a plurality of load terminals, the plurality of load terminals including a plurality of feed through load terminals and a plurality of receptacle load terminals;
at least one sensor circuit coupled between the plurality of line terminals and the plurality of load terminals, the at least one sensor circuit being configured to provide at least one sensor signal based on an AC power signal propagating in the AC electrical distribution system;
a fault detection circuit coupled to the at least one sensor circuit and configured to monitor the at least one sensor signal, the fault detection circuit being configured to provide a fault detection signal in response to detecting at least one fault condition in the AC electrical distribution system;
a circuit interrupter assembly coupled to the fault detection circuit, the circuit interrupter assembly including four sets of interrupting contacts that are configured to provide electrical continuity between the plurality of line terminals and the plurality of load terminals in a reset state and configured to interrupt the electrical continuity in a tripped state, the reset state being effected when the circuit interrupter assembly is engaged by a mechanical linkage in response to a user stimulus, the tripped state being effected when the circuit interrupter assembly is disengaged from the mechanical linkage in response to the fault detection signal;
a voltage transient suppression circuit connected between the plurality of line terminals, the voltage transient suppression circuit including
a movistor differentially coupled relative to the at least one sensor circuit such that one lead of the movistor is coupled to a first line conductor disposed on a line side of the at least one sensor circuit and another lead of the movistor is coupled to a second line conductor disposed on a load side of the at least one sensor circuit, and
a movistor protection circuit coupled in series with the movistor, the movistor protection circuit being configured to limit an amount of electrical energy applied to the movistor as a function of at least one electrical parameter;

a test circuit that is coupled to the plurality of line terminals, the test circuit being configured to automatically generate a simulated fault condition signal that simulates the at least one fault condition on a periodic basis;

an end of life monitoring circuit configured to monitor the fault detection circuit for a test acceptance signal in response to the simulated fault condition, the test acceptance signal being provided by the fault detection circuit when the fault detection circuit is not experiencing an end of life condition; and an end-of-life actuation circuit configured to effect the tripped state when the test acceptance signal is not generated within a predetermined period of time.

* * * * *